F. L. RAPSON.
RESILIENT WHEEL FOR VEHICLES.
APPLICATION FILED MAR. 1, 1921.

1,413,189.

Patented Apr. 18, 1922.
2 SHEETS—SHEET 1.

INVENTOR,
F. L. Rapson,
BY E. G. Siggers
ATTORNEY.

F. L. RAPSON.
RESILIENT WHEEL FOR VEHICLES.
APPLICATION FILED MAR. 1, 1921.

1,413,189.

Patented Apr. 18, 1922.
2 SHEETS—SHEET 2.

INVENTOR,
F. L. Rapson,
BY
E. G. Siggers.
ATTORNEY.

UNITED STATES PATENT OFFICE.

FREDERICK LIONEL RAPSON, OF LIVERPOOL, ENGLAND.

RESILIENT WHEEL FOR VEHICLES.

1,413,189. Specification of Letters Patent. Patented Apr. 18, 1922.

Original application filed September 16, 1919, Serial No. 324,082. Divided and this application filed March 1, 1921. Serial No. 448,918.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Resilient Wheels for Vehicles, (for which I have filed application in England May 14, 1919, Patent No. 141,927,) of which the following is a specification.

This invention relates to resilient wheels for vehicles, and particularly to pneumatic tyres of the kind wherein a resilient member is employed between an inner pneumatic tube or tubes and an outer cover formed with beaded edges to engage in a wheel rim of substantially the usual shape, the said resilient member being formed with circumferential wings or extensions to wholly enclose the inner tube or tubes.

In tyres of the above kind it has previously been proposed to form rows of spaced depressions in the sides of the resilient member. In tyres provided with a resilient member adapted to be disposed between the tread portion of the outer cover and the inner tube it has previously been proposed to form circumferential cushion apertures by providing grooves in the said resilient member.

The object of this invention is to provide a pneumatic tyre in which the inner tube will be positively safeguarded against ordinary puncture from road débris, which will also be more resilient and cooler running than an ordinary pneumatic tyre and further, to provide a pneumatic tyre in which the objectionable feature of a series of bounces occurring after the tyre has passed over an obstruction, as in the present-day pneumatic tyres, will be eliminated.

A further object is to so form the outer cover and shock absorbing and deflecting member that when the said tyre is under compression a substantially flat surface will rest on the road to prevent skidding or rolling.

With these and other objects in view the invention is characterized in that the tread portion of the resilient member of the type above described is formed with circumferential grooves of concave shape in cross section to provide cushion orifices between intermediate ribs on the said member and the outer cover.

It will be seen that the said resilient member is so constructed that when distorted during each revolution of the tyre the tendency is to turn or deflect outwardly any road débris that has penetrated the outer cover.

The invention will now be described with reference to the accompanying drawings, in which—

Figure 3:
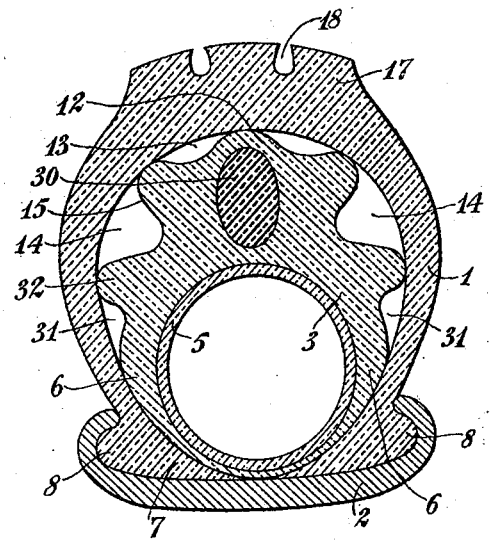
Figure 4:
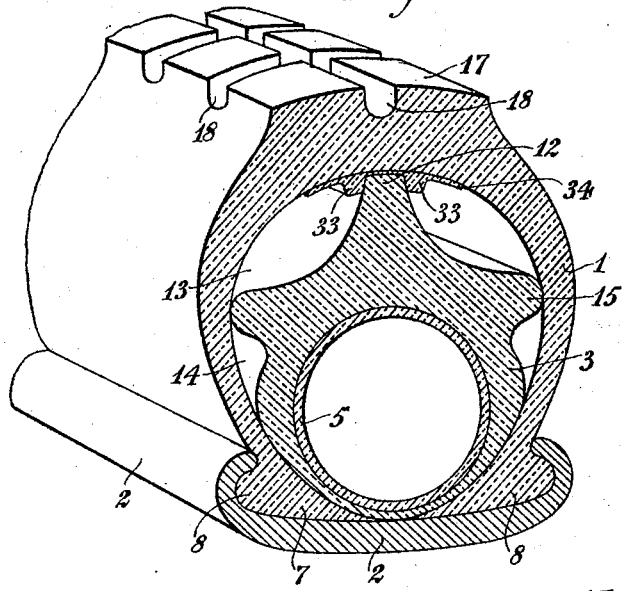

Figures 3, and 4, are cross sections of further modified forms of resilient shock absorbing and deflecting members and outer covers.

Figure 1:
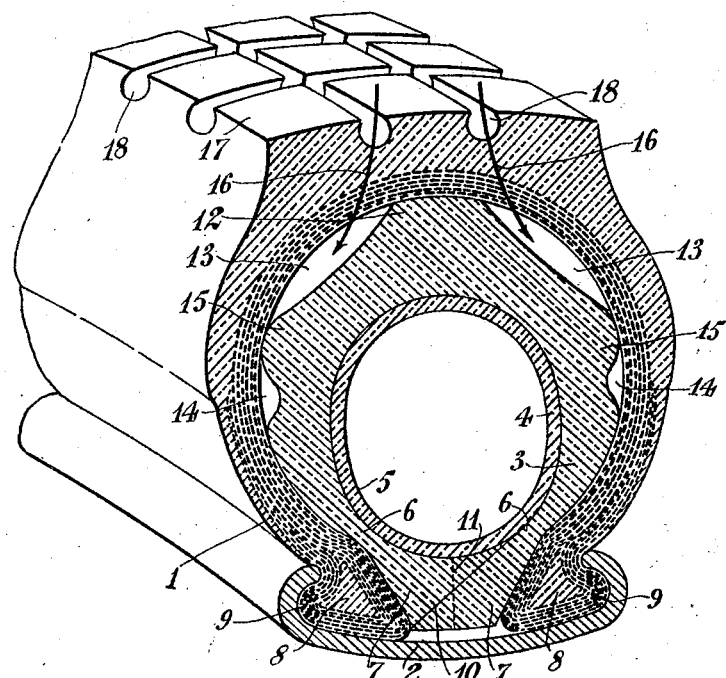
Figure 1 is a cross section of one form of tyre constructed according to this invention.

According to one form of this invention, as shown more particularly in Figure 1, I provide within an outer cover or tread cover 1 and a wheel rim 2 which may be divided in the usual manner, an annular shock absorbing and deflecting member 3 of rubber or other suitable resilient material preferably of soft rubber. This annular shock absorbing and deflecting member 3 which is adapted to partly absorb shocks and deflect any road débris entering the tyre from penetrating the inner tube, is formed with a trough 4 of substantially circular or oval shape in cross section. This trough 4 is adapted to contain a pneumatic tube 5 of small cross sectional area, preferably about half the area of an inner pneumatic tube which would be employed for an outer cover of this size.

The sides of the trough 4 are gradually tapered or reduced to form wings 6 and these wings are enlarged to form circumferential extensions 7 which are adapted to lie beween the inner tube 5 and the tri-angularly shaped inner circumferential portions 8 of the outer cover 1 formed adjacent to the beaded edges 9 thereof which is adapted to lie in the usual curved circumferential grooves of the wheel rim 2. These extensions 7 are shaped to provide a seating for the inner tube 5 and fill up the space between the portions 8 of the outer cover 1 and the rim 2. The extensions 7 may be triangularly shaped to overlap each other as shown by the full line 10 in Figure 1 to permit of the assembling of the tyre on the rim. It will be understood that these extensions 7 may be of any shape to interlock with each other or abut against each other as shown in dotted lines at 11. When the inner tube 5 is inflated the extensions 7 are forced hard on to the portions 8 of the outer cover to lock the beads in the wheel rim 2. Thus every part of the beads 9 of the outer cover is positively gripped and the inner tube 5 which is retained in its normal shape, is saved against rust or other foreign matter which may adhere to the inner face of the rim 2. The outer circumference or tread portion of the shock absorbing and deflecting member 3 is formed with a rib or the like 12 by providing circumferential concave cavities 13 at each side of the central rib 12. Each side of the deflecting member 3 is also formed with a concave recess 14 to provide an additional circumferential air space and a circumferential rib 15 between the concavities or recesses 13 and 14. It will be seen that should the outer cover 1, which is preferably of the usual shape, be perforated by a nail or other foreign matter, the displacement of the deflecting member 3 during each revolution of the tyre will tend to turn or deflect outwardly, as indicated by the arrow 16, any road débris, such as nails, flints, etc., that has penetrated the outer cover 1, thereby positively safeguarding the inner tube 5 against ordinary punctures.

The tread of the outer cover 1 is preferably shaped to provide a number of substantial square, oblong or rectangular shaped upstanding tread blocks 17. The tread is formed with circumferential grooves and transverse grooves 18 of any suitable shape. These grooves 18 are preferably of concave shape or undercut, as shown in Figure 1. This form of tread forms the subject matter of my co-pending application No. 28,399/19. I preferably arrange three circumferential rows of blocks 17 of any width on the tread, but the inner block may be twice the width of the outer, or vice versa. When a pair of inner tubes 5 is provided, I prefer to arrange five rows of blocks 17 on the said tread, or on a very light vehicle two rows of blocks would suffice, as shown in Figure 4.

In use the pressure of the air in the inner tube 5 will always tend to press the extensions 7 of the deflecting member 3 against the triangular shaped portions 8 of the outer cover 1 and the bead portions 9 of the outer cover in the bead flanges of the rim 2. When the weight is on the wheel the section of the tyre on the road surface will be compressed and the contacting surfaces of the cover and deflecting member will not rub or slide upon each other but will distort to eliminate or partially eliminate the cushion spaces 13 and the tyre will flatten and form a wide contact surface on the road. It will be seen that any shock from any unevenness in the road surface will be transmitted through the deflecting member 3 to the pneumatic tube 5; thus part of the shock will be absorbed by the deflecting member 3 before reaching the inner tube 5. By arranging the inner tube 5 within the deflecting member 3 it will be almost impossible to puncture the same and the perishable effect on the rubber usually caused by the canvas of the cover rubbing on the inner tube, and the consequent excessive heat when the wheel is traveling at a high speed, will be eliminated.

Figure 2:
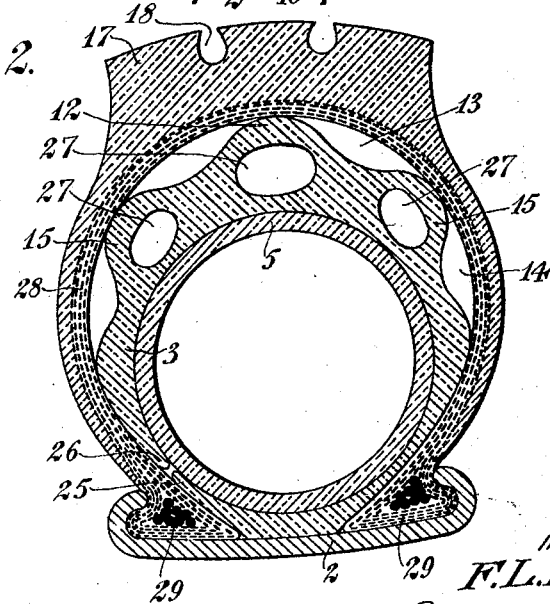
Figure 2 is a cross section of a slightly modified construction.

In a modified construction as shown in Figure 2, the deflecting member 3 is divided at one side and the meeting edges 25 and 26 are suitably tapered. These tapered edges 25 and 26 are so arranged that they abut or overlap each other. The deflecting member 3 is also formed with circumferential or part circumferential air chambers or orifices 27 arranged adjacent to the ribs 12 and 15. These chambers 27 may be filled with soft spongy rubber, cork, or with a hard resilient core. The outer cover 1 is formed with square or rectangular shaped tread blocks 17 and intervening circumferential and transverse concave grooves 18 as in the previous construction, and is also formed with canvas layers 28 arranged all round the interior face and beads, and with piano-wire beads 29 arranged in substantially the usual manner.

In a further modified construction, as shown in Figure 3, the tread portion of the deflecting member 3 is formed with preferably a single circumferential aperture 30 which may be filled or partially filled with a core of hard rubber, spongy rubber, cork or other material of more or less resiliency than the soft rubber employed for the main portion of the deflector 3. This aperture 30 is of substantially oval or elliptical shape in cross section and the major axis of this shaped aperture 30 is arranged radially and in the centre of the main portion of the shock absorbing and deflecting member 3. It will be understood that the aperture or apertures may be of sector shape to extend for part or parts of the circumference of the member 3. This member 3 which is symmetrical in cross section, is formed with circumferential grooves 13, 14 and 31 to provide a central circumferential rib 12 and side ribs 15 and 32 preferably curved in cross section. In this instance the wings 6 of the member 3 substantially meet each other to enclose the air tube 5.

In a further modified construction intended for light cars, as shown in Figure 4, the main body portion of the deflecting member 3 is of substantially inverted T shape in cross section to provide a central upstanding circumferential rib 12 to engage with the inner surface of the tread of the outer cover 1. To the inner surface of the tread portion of the outer cover 1 is vulcanized or secured in any suitable manner, a pair of inwardly extended circumferential ribs 33 which are adapted to engage each side of the said upstanding rib 12 to prevent lateral movement of the said member 3 within the outer cover 1. The pair of inwardly extending circumferential ribs 33 is preferably formed on a backing of canvas, rubbered canvas or other suitable material 34 which is vulcanized to the rubbered canvas of the inner tread portion of the outer cover 1.

If desired the deflecting member 3 in any of the above described constructions may be divided circumferentially or radially to facilitate it being placed into position in the outer cover and the divided portions may be dovetailed or otherwise suitably shaped to interlock with each other. It will be also understood that a plurality of inner tubes may be prevented in the deflecting member 3.

It will be seen that I have provided an unpuncturable tyre in which the weight is taken through a partially resilient deflector, wholly resilient tube, and the upper portion of the cover or tread.

In use a very resilient tyre is provided as the contact pressure on the tread of the tyre varies according to the surface of the road; for instance, should one side of the tread contact with a bump on the road, the shock absorber or deflector 3 is so constructed that it will be compressed or distorted and act as a resilient cushion to absorb or partially absorb the shock before it reaches the inner tube.

This application is a division of my application filed Sept. 16, 1919, serial number 324,082.

What I claim is:—

1. A resilient tire for vehicles comprising, in combination, an outer casing of substantially the usual shape, an inner tube, and a resilient member interposed between the said casing and the inner tube and provided with wings forming extensions adapted to enclose the inner tube, the outer periphery of the resilient member which engages the inner side of the outer casing being provided with circumferential concave grooves providing cushion spaces upon opposite sides of an intermediate rib, said rib being adapted to deflect road débris penetrating the outer casing away from the inner tube and in opposite directions upon opposite sides of the rib.

2. In a resilient wheel for vehicles, a rim, a casing seated on the rim, a pneumatic tube within the casing, and a resilient shock absorbing and transmitting member arranged between said casing and the pneumatic tube, said shock absorbing member being provided with one or more compressible ribs forming deflectors having their sides inclined from the points where the ribs engage the inner surface of the outer casing, whereby the greater the ribs are compressed the greater the resistance will the inclined sides have to road débris penetrating the outer casing.

3. In a resilient wheel for vehicles, an outer casing, a pneumatic tube within the casing, and a resilient shock absorbing and transmitting member arranged between said casing and the pneumatic tube and formed with two or more circumferential concavities and one or more intermediate ribs, the sides of said ribs deflecting road débris outwardly from the inner tube and through the circumferential concavities.

4. In a resilient wheel for vehicles, a rim, an outer casing seated on the rim, a pneumatic tube within the casing, and a resilient shock absorbing and transmitting member arranged between said casing and pneumatic tube and wholly surrounding said tube and comprising a plurality of ribs, and resilient wings formed by the extension of one of the inclined sides of oppositely disposed ribs and engaged by beads on the outer casing, the other side of each of the oppositely disposed ribs being adapted to act as a deflector for road débris.

5. A resilient tire for vehicles comprising, in combination, an outer casing, an inner tube, and a resilient member interposed between the said casing and the inner tube and provided with wings forming extensions adapted to enclose the inner tube, the outer periphery of the resilient member being provided with circumferential substantially concave grooves providing cushion spaces upon opposite sides of intermediate ribs, and inwardly extending circumferential ribs on the tread portion of the outer casing engaging each side of the central one of said ribs.

In testimony whereof I have hereunto signed my name.

FRED. LIONEL RAPSON.